United States Patent [19]
Bernardo

[11] Patent Number: 5,350,213
[45] Date of Patent: Sep. 27, 1994

[54] APPARATUS FOR POSITIONING, LATCHING AND LOCKING A RETRACTABLE TRUCK BED COVER

[76] Inventor: Richard G. Bernardo, 2350 NE. 29th St., Lighthouse Point, Fla. 33064

[21] Appl. No.: 30,671

[22] Filed: Mar. 12, 1993

[51] Int. Cl.⁵ ............................................... B60P 7/02
[52] U.S. Cl. .................... 296/98; 296/100; 160/133; 292/36; 292/DIG. 43
[58] Field of Search ............... 296/98, 100; 160/133; 292/36, 345, 158, DIG. 43

[56] References Cited

U.S. PATENT DOCUMENTS

| | | | |
|---|---|---|---|
| 3,951,061 | 4/1976 | Hansen et al. | 292/36 X |
| 4,015,454 | 4/1977 | Struble | 292/36 X |
| 4,210,361 | 7/1980 | Marvin et al. | 296/100 X |
| 4,547,014 | 10/1985 | Wicker | 296/100 |
| 4,762,360 | 8/1988 | Huber | 296/100 |
| 4,900,080 | 2/1990 | Morris, II | 296/100 |
| 4,909,561 | 3/1990 | Lovaas | 296/100 |

OTHER PUBLICATIONS

Automotive News, Dec. 26, 1983, p. 14 "Automatic Cover for Truck Beds".

Primary Examiner—Dennis H. Pedder
Attorney, Agent, or Firm—Malin, Haley, DiMaggio & Crosby

[57] ABSTRACT

A position control, latch, and locking apparatus for use with a retractable cover used to securely enclose a pickup truck utility bed. The latch and lock mechanism is placed in a modified lead slat of the cover for latching to the cover guide tracks and to the tailgate. A key lockable actuating handle is placed on the slat concealing linkage arms pivotally connected to the handle further attached to a first and second diametrically opposed push rod for simultaneous operation of a four point spring biased latching mechanism. A flexible strap is connected to the cover to manually move the cover. The latching mechanism secures the cover to the sidewalls of the pickup truck as well as locking the tailgate in an upright position. A tailgate lip cover and attachment device is also disclosed for securely fastening the modified slat to the tailgate and provide a planar surface allowing for sealing and concealment of the latching mechanism.

12 Claims, 5 Drawing Sheets

APPARATUS FOR POSITIONING, LATCHING AND LOCKING A RETRACTABLE TRUCK BED COVER

BACKGROUND OF THE INVENTION

1. Field of the Invention

This invention relates generally to a retractable truck utility bed cover and, in particular, to an apparatus for positioning, latching, and locking a retractable rolling security cover used to securely enclose (partially or fully) a truck utility bed.

2. Description of the Prior Art

Truck bed covers are known to protect a pickup truck bed enclosure and especially items placed therein. By securing a cover to the truck bed side rails, an enclosure is formed capable of protecting items against theft and exposure to rain, snow, and wind. The cover may sometimes provide an aerodynamic profile and, depending upon the overall shape and profile, enhance gasoline mileage.

Rollable or roll up covers have improved the pickup truck cover by providing a slidable, retractable, impervious cover positionable over the entire length of the bed. A rolling truck bed cover may be comprised of a plurality of elongated plastic or aluminum slats hinged together and disposed between a pair of parallel guide tracks, each securely clamped to opposite sides of the utility bed. One end of the retractable cover connected to a reel in a reel housing about which the cover can be rolled. The cover free end should be secured at or near the tailgate to prevent the unauthorized entrance and access into the utility truck bed enclosure formed by the cover.

The rolling truck bed cover for which this invention is used is comprised of a plurality of elongated rectangular slats hinged movably in a side by side array having arcuate male and female hinges along the longitudinal edges which interlock adjacent slats together providing an impervious surface in a closed position. Each slat is constructed of extruded aluminum and includes an elongated seal member in each arcuate slat hinge to protect against water entry. A slat end block constructed of molded plastic is placed at each end of the slat for contact with the guide tracks on both sides. Upper and lower plastic guide runners mounted in the guide tracks frictionally engage the lower surface of each slat and limit upward movement providing non metal contact to reduce or eliminate noise.

Lockable retractable truck bed covers are shown in the prior art. U.S. Pat. No. 4,807,921, issued to Champie, discloses a sliding cover for a truck bed which includes the use of a recessed paddle-handle lock to secure the cover to the tailgate. Champie discloses the paddle-handle lock which eliminates the need for the "T" handle rod lock generally used to latch components onto the sides of a pickup truck bed. Champie does not disclose or teach a device to lock the cover in an open, partially open, or otherwise to the sidewalls as well as the tailgate.

U.S. Pat. No. 4,795,206, issued to Adams, discloses a pickup truck cover system which includes a tailgate locking mechanism to lock the cover in the closed position. The locking mechanism employs a spring member to bias the engagement latch in an open position and a key member to secure the engagement latch and cover forming an impervious enclosure. Adams illustrates a conventional latch using a hook and cam portion which is pivotally connected to the rail for use in locking the cover to the side rail. Adams illustrates a hook portion with a latch member to engage a plate member mounted on the tailgate. Under such a teaching, the Adams locking mechanism requires multiple locking locations to secure the cover. The key system of the Adams device is complicated and dependent upon a latching mechanism that could be overcome with force.

U.S. Pat. No. 4,889,381, issued to Tamblyn et al. Dec. 26, 1989, shows a retractable truck bed cover that includes a conventional key actuated arm that fits into a slot on the tailgate, apparently a single locking point.

U.S. Pat. No. 4,611,848, issued to Romano for a sliding cover assembly for open body trucks Sep. 16, 1986, shows a latch handle at the rear of the truck without discussion.

One of the drawbacks of all these devices is the fact that the manual actuation, which requires the operator to physically walk from one end of the bed to the other in order to secure closure, appears deficient. Actuation of the entire cover is awkward, time consuming, and cumbersome. Also, none of the bed covers discussed provide for intermediary positions where the cover can be secured so that the cover can be partially open. Finally, the cover locking mechanisms in most of these devices appear to be inadequate to securely prevent someone from easily overcoming the locking mechanism for unauthorized disclosure, reducing the security advantage of the device.

The instant invention addresses the aforementioned problems by providing a four point latch and lock system made operational from a single key operated location. The invention provides for locking the cover to each side rail guide track and two separate locations on the tailgate for optimum securement. The cover can also be positioned and secured to a number of intermediary positions between full open and complete closure. Most importantly, the closure can be operated from a single location by one person at the tailgate for full open, partial open, complete closure, and lock, using an actuating strap and a lock set handle.

SUMMARY OF THE INVENTION

A retractable truck bed cover apparatus for positioning, latching, and locking, and especially for opening, partially closing, fully closing, and locking the cover in place, comprising a cover pull strap, a multiple function latch bolt assembly mounted in both ends of the cover lead slat that engages the guide tracks (and tailgate for fully closed) in the secured position, a latch bolt lock set handle (hereinafter called the lock set handle), and linkage arms connected thereto, said centrally mounted lock set handle used to activate and deactivate the latch bolt assembly to engage or disengage the latch bolt assembly. Each guide track includes a plurality of slots spaced from front to back along the bed that receive and secure spring mounted bolts in the latch bolt assembly at each position. The tailgate also includes a linear member with latch pins affixed thereto, which engage a latch mounted in the latch bolt assembly. Fully closed, the cover is secured at four places, i.e. two guide tracks and two tailgate latch pins.

The manually activated pull strap is connected to the center of the free end of the cover and sized in length to extend the full length of the truck bed to allow one person complete activation of the cover position and locking apparatus from the center of the tailgate area.

The cover positioning and locking apparatus includes a cover retraction spring, mounted in the cover reel, that provides constant spring tension on the bed cover at all times, acting to retract the cover into the reel housing.

The reel housing also includes a set handle activating element near the cover opening, positioned to engage the lock set handle which activates the latch bolt assembly and locking mechanism each time the cover is retracted fully into the reel housing by the spring tension.

A key activated locking mechanism is incorporated in the lock set handle and when locked, prevents movement or actuation of the linkage arms connected to the latch bolt assembly.

The guide tracks that allow the cover to slide and retract contain opposing pairs of bolt receiving slots, each having an angled sidewall that allows the bolt arcuate surface to escape in one direction, but engaging a flat wall on the bolt on the opposite side to prevent the bolt from moving backward toward the reel. Because of the configuration of each of the bolt receiving slots in the guide tracks, the cover can be manually pulled by the actuating strap from the reel housing toward the tailgate. During the travel from the reel housing, the bolts will enter into pairs of slots located preferably at one-quarter, one-half, and three-quarters the distance from the reel housing, which would allow the cover to be stopped in that position and secured in that position. Continued pulling on the strap, however, forces the bolts against the angled slot walls and the bolt springs compress, allowing the bolts to move out of the slots so that the cover can be continuously pulled back to the tailgate.

The latch bolt assembly includes two spring actuated bolts and two tailgate latches, one pair on each side of the lead slat that ultimately confronts the tailgate.

Each latch bolt assembly includes a forked frame, a rod and spring connected to the latch bolt that moves along the forked walls reciprocally under spring tension, and a tailgate latch rigidly interconnected with the bolt so that reciprocal motion of the bolt will provide equal reciprocal motion of the latch for the tailgate. The forked frame is connected to one of the linkage arms which pivots and is offset, connected to the lock set manual handle. The lock set handle is rotationally connected to the lead slat and with the offset pivot points connected to linkage arms on each side, rotation of the Lock set handle (manually or by actuation with the reel housing) moves the linkage arms, either activating or deactivating the bolt mechanism and the tailgate latch on each side.

To operate the device starting from the position when the cover is rolled up about the reel and in the reel housing, the elongated nylon actuating strap will be pulled toward the tailgate by a person standing at the tailgate.

In this position, as the cover leaves the reel housing, the lock set (actuating) handle has already been rotated and activated (when the cover end and handle entered the reel housing) to a position forcing the linkage arms outwardly toward the guide tracks, such that the bolts are against spring tension as the cover is moved toward the tailgate with the bolts being engaged against the guide track wall. When the bolts on each side encounter a slot in the guide tracks, the spring tension forces the bolts into the slots on each side. If the cover is stopped in this position and not pulled toward the tailgate, the cover will be secured in the slots through the bolts and remain fixed in that position. However, if the quarter bed length position is not desired, then the strap is pulled and each bolt's curved surface on one side pushes against the angled wall of each slot, causing the bolt to compress inwardly against the spring tension again, until the bolt is free of the slot on each side. The cover can continue to be pulled toward the tailgate. The slot/bolt interaction may be repeated at the intermediate points where there are slots. Finally, there are a pair of guide track slots adjacent the tailgate where the bolts on both sides fit into the slots to latch the cover in a fully secured position. At the same time, the tailgate latch mechanism engages two latching pins mounted in the linear member attached to the tailgate (when the tailgate is in the up position), which therefore provides that the latch bolt assembly on each side of the lead slat is securely engaged to the guide track and the latch pin in the tailgate on both sides. The cover remains in spring tension in the closed position. A key locking mechanism in the lock set handle can be activated to lock the apparatus.

To open the enclosed bed, a person standing at the center of the tailgate manually rotates the lock set handle, causing the linkage arms to rotate inwardly retracting the bolts and tailgate latches, moving the bolts out of the slots and the latch mechanisms away from the latching pins in the tailgate, thus freeing the entire latching assembly so that the spring tension now acts to pull the cover back to the reel housing. The operator will use the strap to manually resist rapid movement from spring action of the cover returning to the housing by tugging slightly against the spring tension, allowing the cover to move into the reel housing at a controlled speed. As the cover moves into the reel housing at the lead slat, the lock set handle is sized to extend and contact an activating element near the opening in the reel housing, causing the handle to rotate approximately 120° to a position where the linkage arms are reset outwardly again, forcing the bolts outwardly under spring tension to prepare them for the latching action during the next closing operation of the cover over the bed.

Therefore, the entire device can be opened or closed conveniently and quickly by one person standing at one position near the center of the tailgate. Also, the cover can be securely fastened to intermediate positions along the bed length between open and closed, if desired.

Note that the lock set handle has two operating positions which permit either the securing of the latch bolt assembly in the slots for fastening or securing of the cover, and opening of the bed by retraction of the cover. When the lock set handle is moved to the open position, the bolts are disengaged from all slots and the tailgate latch is in a disengaged position relative to the latch pins in the tailgate. When the cover is to be retracted, the lock set handle is manually rotated to the open position. As the free end of the cover is retracted into the reel housing, a specially formed element in the housing lid forces the lock set handle to rotate like a cam counter clockwise back to the bolt locking position which extends the push rods and linkage arms, pushing the bolts into a spring action, readying them to repeat the cycle.

It is an object of this invention to provide a truck bed cover positioning, latching, and locking mechanism for use with a slatted, rollable truck bed cover that securely fastens the rollable cover in a closed and locked position to protect items disposed in the truck bed.

It is another object of this invention to provide a four point latching mechanism that allows a retractable truck bed cover to be latched and locked to both the guide tracks and the tailgate of the truck bed.

It is another object of this invention to provide a truck bed cover that can be positioned and locked by a single operator standing in one position near the center of the tailgate to open, partially close, fully close, and lock the cover from that position.

Yet another object of the instant invention is to provide a tailgate lip attachment device for use in conjunction with said latching mechanism to provide a sealable surface on any type of tailgate and further conceal the latch mechanism for optimum security.

In accordance with these and other objects which will be apparent hereinafter, the instant invention will now be described with particular reference to the accompanying drawings.

PREFERRED EMBODIMENT OF THE INVENTION

Figure 1:
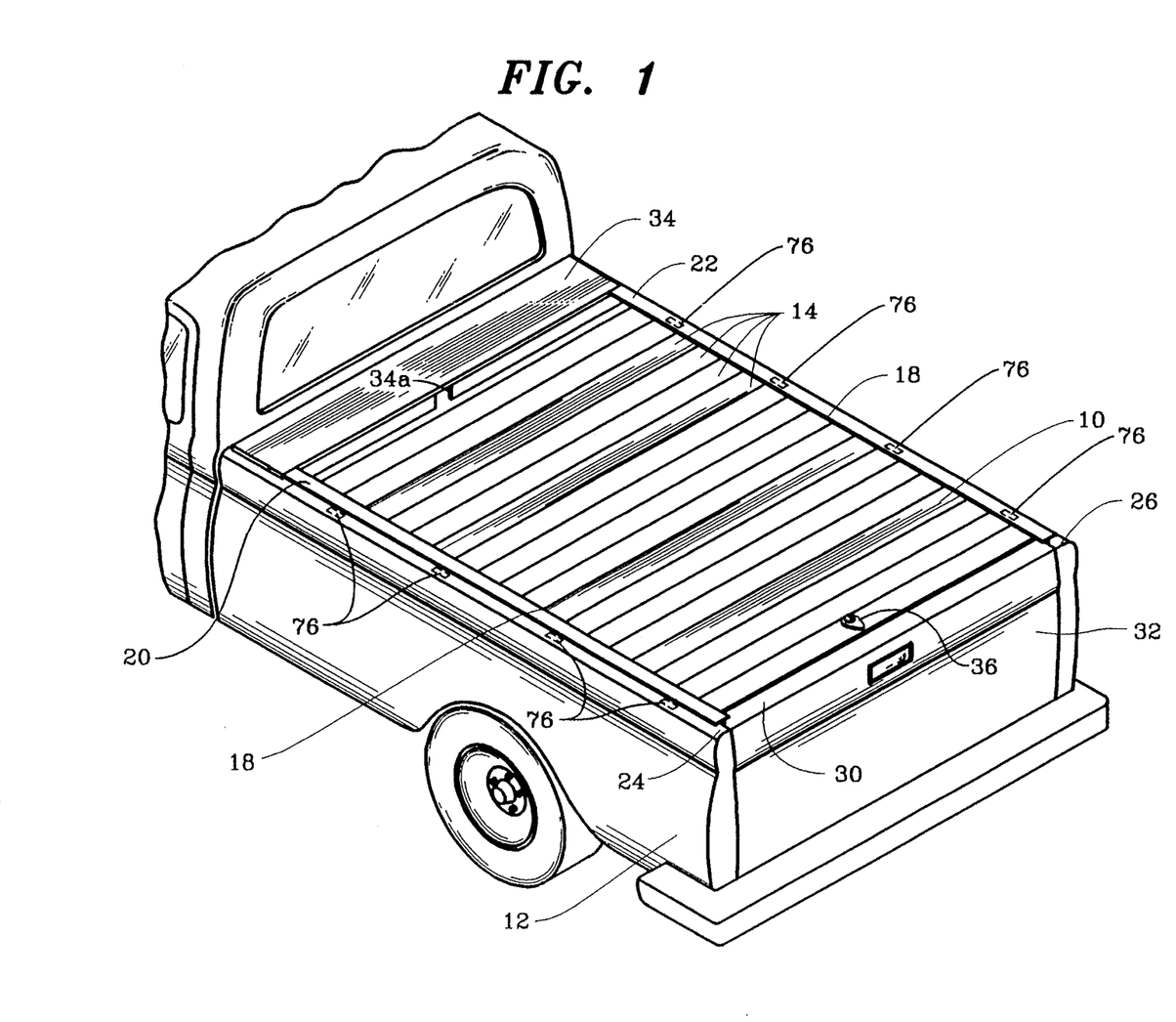
FIG. 1 is a perspective view of a truck bed cover in accordance with the invention installed on a conventional pickup truck utility bed.

Referring now to the drawings and specifically FIG. 1, a rolling truck bed cover 10 is shown installed upon a conventional pickup truck 12. The cover 10 is constructed with a plurality of metal or plastic slats 14 which extend laterally across the truck bed and are pivotally interconnected in a side-by-side array along their side edges 18 so as to form a rollable bed cover. A first guide track 20 and a second guide track 22 are disposed in parallel, each mounted on the outboard truck bed rails 24 and 26, respectively. Guide tracks 20 and 22 are formed from extruded aluminum and include C-shaped passageways with opposing openings facing inwardly substantially horizontal. A clamping bracket secures each guide track to its respective bed rail in a fixed position without damage to the bed sidewalls. The cover, guide rails, and clamps are fully disclosed in co-pending U.S. patent application entitled "ROLLING COVER FOR A TRUCK UTILITY BED HAVING IMPROVED REEL SUPPORT HOUSING AND GUIDE TRACK CLAMPS" filed Jul. 30, 1992 under Ser. No. 07/922,745, now U.S. Pat. No. 5,251,950, incorporated herein as if restated in its entirety.

The instant invention is a cover positioning, latching, and locking apparatus for use with the above rolling cover system or other retractable cover mechanism that is capable of fastening and locking the cover 10 to guide tracks 20 and 22 and to a truck tailgate 32. The lock set handle 36 actuates the latching mechanisms and includes a key actuated lock.

Figure 2:
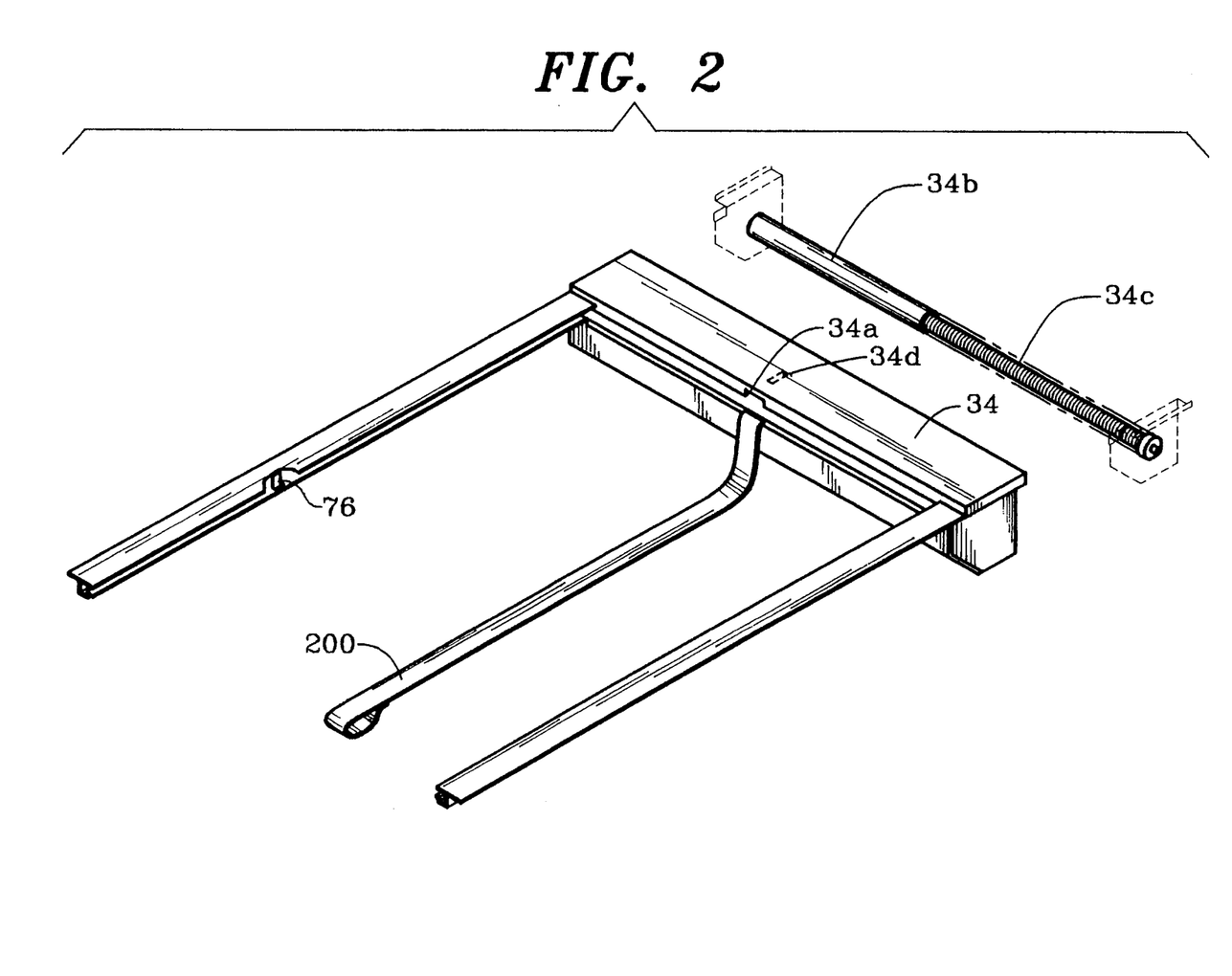
FIG. 2 is a perspective view of a truck bed cover reel housing, guide tracks with the cover enclosed in a reel housing, with an exploded view of the spring and reel mechanism used in the housing, an enlarged view of a typical bolt receiving slot used along the guide rails, and a perspective view of the strap that is used to actuate, to open and close the truck bed cover.
Figure 5:
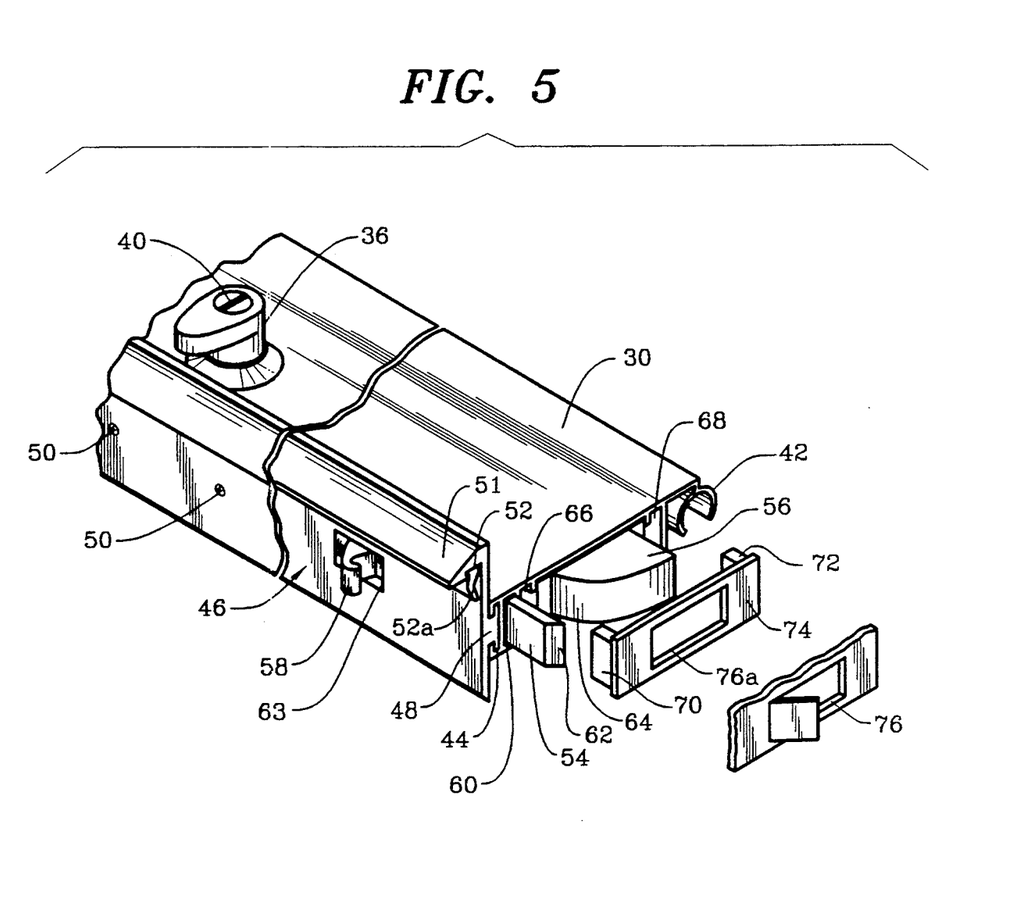
FIG. 5 shows a perspective, partially cut away, enlarged view of one end of the lead slat that contains the latch bolt assembly.

Referring to FIG. 2, when the cover 10 is rolled up for storage about a reel 34*b* within housing 34, the truck bed is open. Each time the cover is returned to the reel housing 34, the lock set handle 36 engages a cam-like surface 34*d* inside housing 34 that activates the latch bolt assembly as described below. In accordance with the invention, the cover can be positioned at predetermined positions (¼, ½ and ¾ lengths) along the longitudinal length of the truck bed by use of an actuating strap 200. The guide tracks include a pair of bolt receiving slots 76 with angled wall as shown in FIG. 5, which act as intermediate stops or the final stop for securing the cover in a particular location. By pulling on strap 200 to uncoil the cover in housing 34 against spring tension caused by spring 34*c* on reel 34*b*, the operator stands at the tailgate region and pulls on strap 200. Typically, the plurality of stops 76, which are slots in the guide track wall, are provided equally and oppositely spaced at ¼, ½ and ¾ lengths along the truck bed from the reel and at the end of the guide tracks near the tail gate to allow the cover to be stopped and secured to the guide tracks in the ¼, ½, ¾, or fully closed positions. When the cover is fully extended, completely covering the truck bed, there are end slots in the guide track near the tailgate. The use of a latch bolt assembly on each truck side at each end of the lead slat provides two functions. Each latch bolt assembly as described below employs a spring loaded bolt that is received into the plurality of slots 76 disposed at intermediate positions and the complete closed position for securing the cover in predetermined positions relative to the guide tracks. In addition, the latch bolt assembly provides for latching the cover not only to a pair of slots adjacent the tailgate, but simultaneously to latch pins in the tailgate. The structure of the latch bolt assembly is described in FIG. 3.

Figure 3:
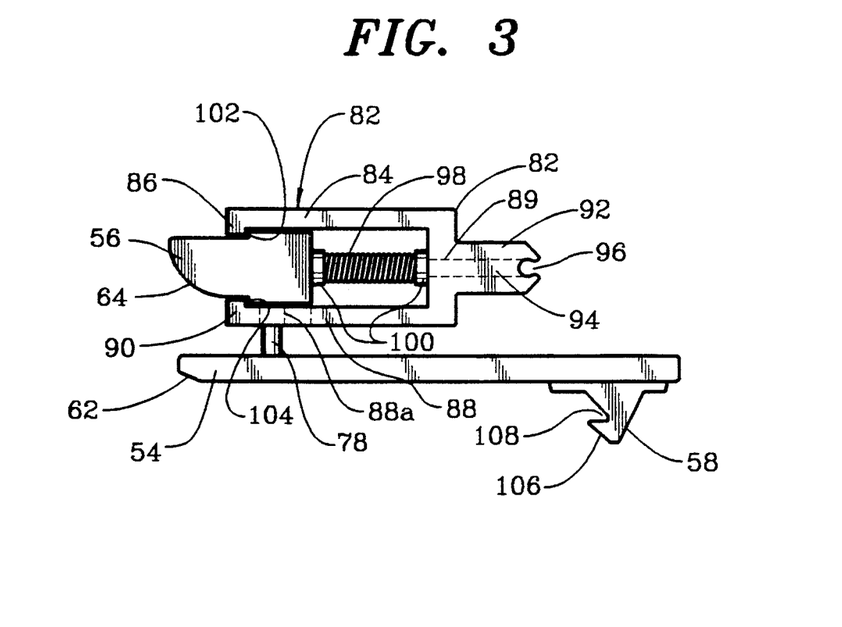
FIG. 3 is a top plan view of the latch bolt assembly that would be used along the left side of the truck bed cover when viewed from the tailgate toward the reel housing.

Now referring to FIG. 3, a top plan view of latch bolt assembly is shown which is used on each end of the lead slat 30. Frame 82 includes a first traverse support member 84 having an inward facing stop shoulder 86. A second traverse support member 88 forms a mirror image thereof by use of an inward facing stop shoulder 90 opposed to stop shoulder 86. The frame end 92 of frame 82 forms a pinion support cavity 94 extending throughout the center of the member. The frame end 92 has a push rod coupling location 96 for acceptance of a screw or the like coupling component for attachment to the spring 98 mounting rod (not shown). Bolt 56 is rigidly attached to bar 54 by rod 78. Bolt 56 slides reciprocally in frame 82 against spring 98 relative to frame 82. Tailgate latch 58 is attached to bar 54. Whenever bolt 56 moves, tailgate latch 58 moves equally. Support 88 includes an elliptical aperture 88a that receives rod 78 to allow movement relative to frame 82 of bar 54. The latch 58 is maintained in alignment by the traverse support member 84 and 88, in conjunction with a spring mounting rod 89, insertable into cavity 94 from the opening provided by coupling location 96, for friction engagement into bolt 56. The spring mounting rod 89 is encompassed by spring 98. The spring 98 holds in tension the bolt 56 against stop shoulders 86 and 90 of the traverse support members, the bolt 56 having corresponding shoulders 102 and 104 for firm shoulder engagement.

As described later in this specification, the insertion of a rod coupling screw into the coupling location 96 permits the spring mounting rod 89 to slide within cavity 94 and maintains the rod 89 in the cavity. The second traverse support member 88 includes an elongated slot 88a in the support member 88 allowing the bolt 56 to be directly coupled to the bar 54 by connecting rod 78. The bar 54 moves in unison with the bolt 56 utilizing the tension of the spring 98 for concurrent operation. The bar 54 is an elongated, rigid metal structure having a length of about 5 inches for maintaining alignment, providing leverage locking force, and for placing the tailgate latch 58 a distance from the beveled distal end 62, further providing a leverage lock between the distal end 62 and the latch 58. Latch 58 includes a curved front 106 leading to the hook section 108 for securing to a pin secured to the tailgate, or more preferably, a linear member attached to the tailgate especially designed to cooperate with hook section 108. The latch 58 is attached to the slide bar 54 by screws, rivets, or the like attachment.

Figure 4:
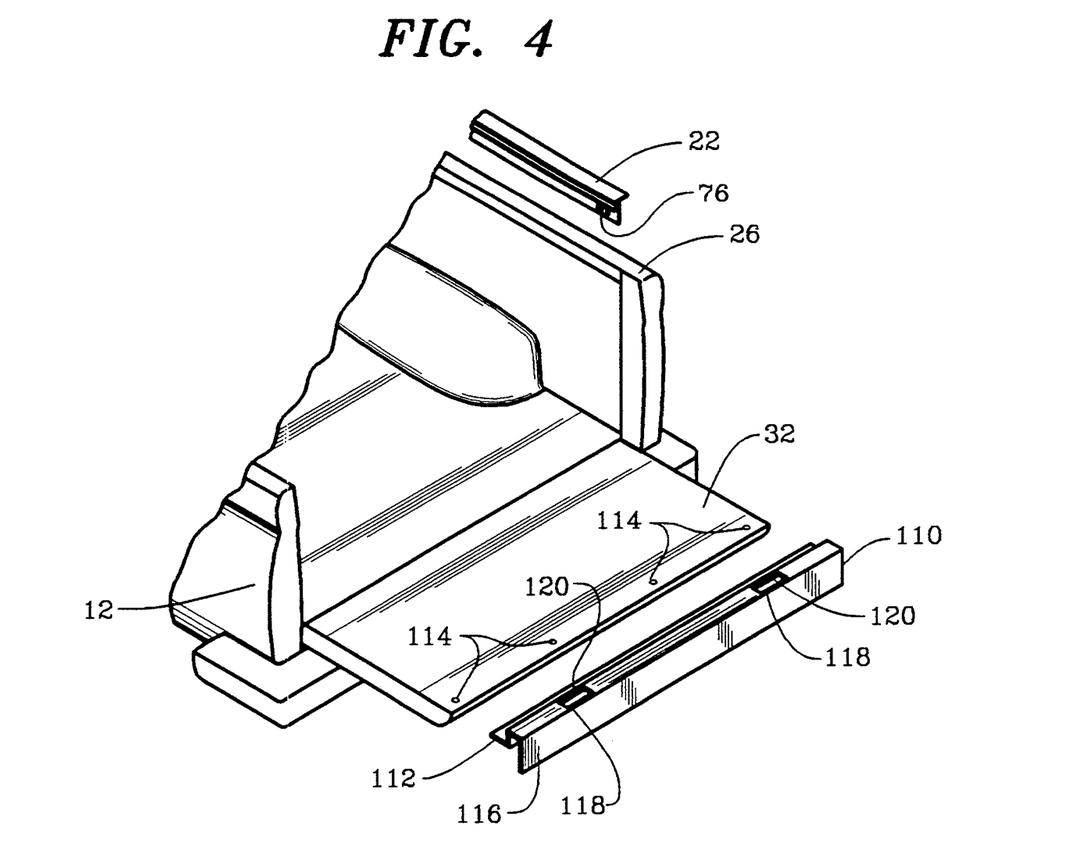
FIG. 4 shows a partially cut away, perspective view of a truck bed tailgate and a tailgate linear member as utilized in the present invention.

Now referring to FIG. 4, a guide track 22 with bolt receiving slot 76 is shown in an exploded view above side rail 26 of the pickup truck 12. A tailgate linear member 110 is attached to the tailgate 32 by screws or other fasteners. The tailgate linear member 110 is an aluminum extrusion with a mounting flange 112 that is placed directly against the tailgate surface wherein a plurality of screw holes 114 are required for permanent attachment. The upper surface 116 of tailgate extrusion 110 provides a flat surface wherein the lip 51 of tailgate cover 46 is juxtapositioned allowing engagement of a seal 52a placed within lip channel 52 of tailgate cover 46 (FIG. 5). Slots 118 accommodate the tailgate latch 58 with vertically placed latch pins 120 allowing engagement of the clasping latch 58, hooking the pin 120 by use of hook section 108. The slots 118 are positioned inward from the tailgate surface to accommodate the depth of the tailgate latch 58 on each side. Thus, two latch bolt elements attach to the guide tracks and the tailgate.

Figure 6:
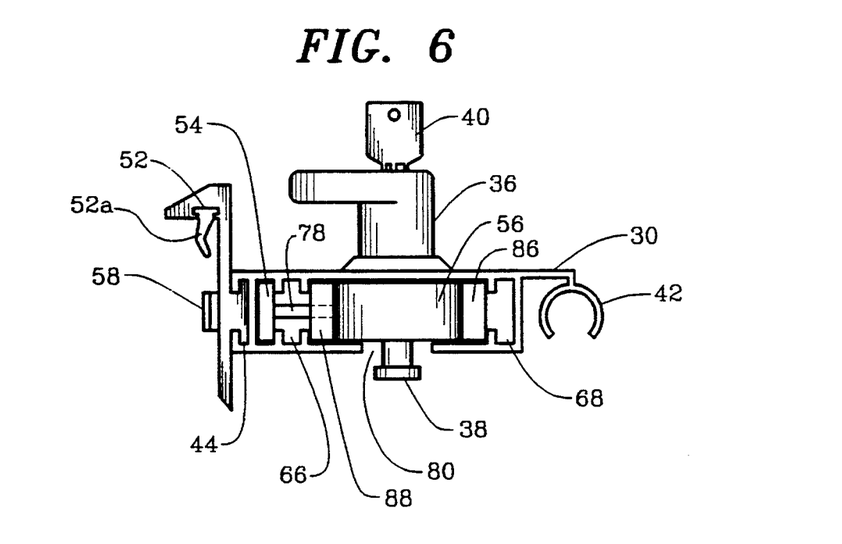
FIG. 6 is a side elevational view of the lead slat and latch bolt assembly, as shown in FIG. 5.

Referring to FIGS. 5 and 6, the center portion and one end of lead slat 30 of cover 10 with bolt 56 is shown with the centrally disposed rotatable lock set handle 36 having a key actuated lock mechanism 40 placed in the center of the handle 36. The opposite end of the lead slat and bolt forms a mirror image. The lead slat 30 is formed from a single piece of rigid material, preferably aluminum, having a male arcuate downward extending hinge connector 42 extending along one side length of the lead slat 30 for pivotal attachment to a female hinge connector (not shown) of an adjoining slat 14. Along the leading edge of the lead slat 30 is formed a channel 44 for engagement of a tailgate lip cover 46. The extruded one piece tailgate lip cover 46 has a male T-shaped protrusion 48 interlocked in channel 44, the protrusion 48 being slidably insertable into the channel 44 and fastened in position by at least one screw 50 placed along the length thereof to eliminate shifting of the protrusion 48 within the channel. The protrusion 48 and channel 44 junction provide an impervious seal with structural strength between the lead slat 30 and lip cover 46 as if the two members were formed from a single piece of material. A lip 51 on the cover includes a channel 52 for insertion of a seal 52a to dampen vibration and further seal out dust, dirt and water when abutting the tail gate. The lock set handle 36 is coupled to a pair of diametrically opposed push rods 38, described later in this specification, which in turn operate a first outward projecting mechanism having a bar 54 directly coupled to a bolt 56 and a first tailgate latch 58 mounted perpendicular thereto. Bolt 56 has beveled and arcuate edges 64 to permit ease of movement out of slots 76, compressing bolt 56 against spring 98 (FIG. 3).

Lead slat 30 includes a front channel chamber 60 for slidable disposition of the bar 54 and an elongated slot 63 for the perpendicular placement of the tailgate latch 58. A front channel opening 66 and rear channel opening 68 are receptive to insertion tabs of 70 and 72 of end bumper 74 wherein the bolt 56 is insertably through opening 76a of end bumper 74, the end bumper 74 providing a non-metal engagement surface for lateral movement of the lead slat within the guide track. FIG. 6 is an end view of lead slat 30. The bar 54 is shown directly coupled to the bolt 56 by connecting rod 78. The tailgate latch 58 is fastened directly to the bar 54. A large centrally disposed chamber 80 allows for the slidable movement of the bolt 56.

Figure 7:
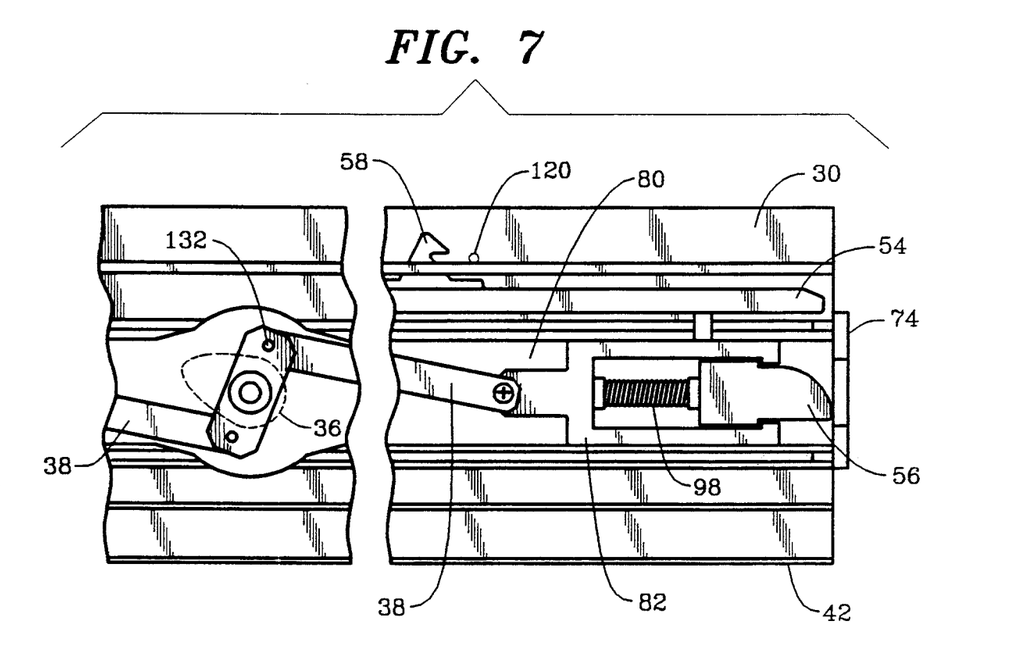
FIG. 7 is a bottom plan view, partially cut away of the linkage arm and actuating mechanism for the latch bolt assembly, in the position where the latch mechanism for the tailgate and the bolt for the guide rail is in a retracted position which would allow the truck bed cover to be pulled by spring tension back to the reel housing.

FIG. 7 depicts the bottom of lead slat 30 wherein housing 82 of the linkage mechanism and latch bolt assembly is slidable disposed within chamber 80. Lock set handle 36 is connected to a lever arm 130 rotatable in direct correlation to the handle, the linkage arm 38 coupled to frame 82. The linkage arm 38 is in turn coupled to pivotal screw attachment location 96 for slidable movement of the latch bolt assembly in relation to the slat 30. As shown in FIG. 7, the leverage arm is rotated to an open position which retracts the housing 82 and removes bolt 56 and latch 58 from positions of engagement. Pin 120 represents the latching pin in the tailgate.

Figure 8:
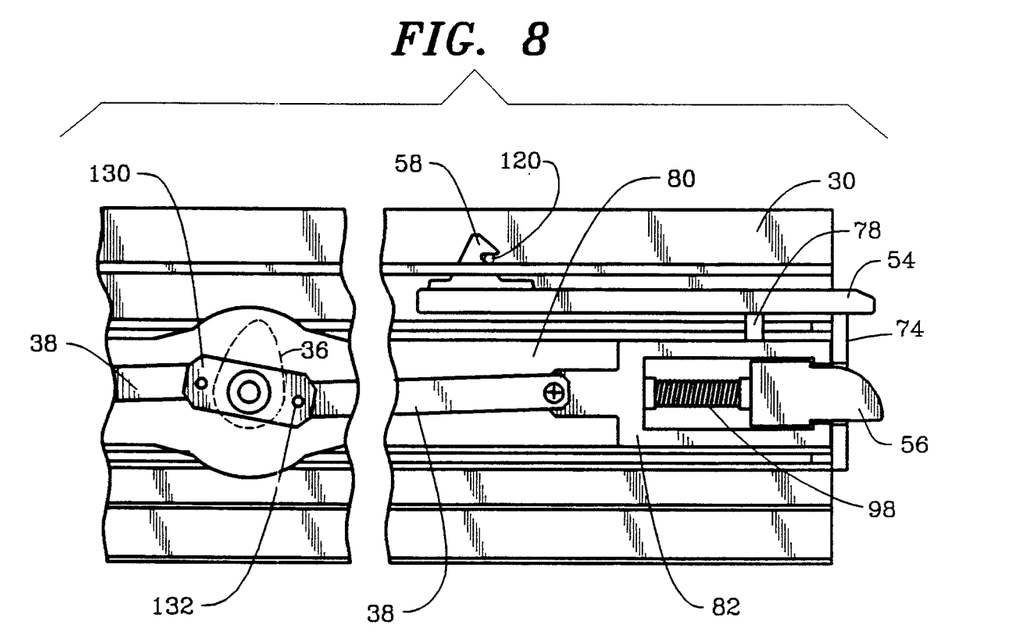
FIG. 8 shows the bottom plan view as shown in FIG. 7, with the lock bolt engaged in the guide rail and the tailgate latch engaged with the tailgate latching pin, which represents the truck bed cover in a fastened position, secured in place.

FIG. 8 depicts the bottom of lead slat 30 wherein lock set handle 36 is rotated so that housing 82 and the latch bolt assembly is slidably disposed with the chamber 80 and placed into an engagement position. The bottom of handle 36 illustrates leverage arm 130 rotated into an over-center position placing bolt 56 and latch 58 in the engagement position. Linkage arm 38 fixes the location of the frame 82, the use of the key lock disabling further rotation of the handle 36. The handle position (rotationally) determines whether the bolt 56 is extended to secure the cover when the bolt 56 is received into a slot 76 or the bolt is retracted, allowing the cover to be pulled by the reel spring back into the reel housing. The handle 36 is automatically rotated by a cam-like element 34d in the reel housing near reel housing opening 34a to advance the bolt 56, each time the cover is stored in the reel housing 34.

The invention has been shown and described herein in what is considered to be the most practical and preferred embodiment. It is recognized, however, that departures may be made therefrom within the scope of the invention and that obvious modifications will occur to a person skilled in the art.

What is claimed is:

1. A retractable utility truck bed cover, positioning, and latching apparatus for covering the open bed of a conventional pickup truck having a conventional tailgate, partially or completely comprising:
   a retractable truck bed cover;
   latch means connected to said truck bed cover for securing said truck bed cover in partially open positions and a fully closed position relative to the truck bed;
   means for actuating said latch means connected to said latch means for engaging or disengaging said latch means;
   said truck bed cover including a guide means, said guide means including a stopping means that is engagable with said latch means for positioning said cover in predetermined locations relative to said truck bed;
   a strap connected to said truck bed cover for manually moving said truck bed cover;
   said latch means activated by movement of said truck bed cover to said stopping means at predetermined locations;
   said latch means including a latch bolt assembly including movable guide track latch bolts engageable with said guide means and tailgate pin latch bolt means said guide track latch bolts and said pin latch bolt means including stops engagable with said bolts attached to guide tracks and pins attached to said tailgate for receiving said tailgate pin latch bolt means, respectively;
   a handle for actuating said guide track latch bolts and said tailgate pin latches, said handle being connected to a lead slat of said coves;
   a truck bed cover housing for receiving said truck bed cover in a retracted, rolled-up disposition;
   a biased reel mounted in said truck bed cover housing for biasly receiving said truck bed cover in said rolled-up disposition; and
   means connected adjacent to the path of said handle as said truck bed cover is retracted for mechanically rotating said handle at a particular location relative to the truck bed cover and truck bed cover reel housing.

2. An apparatus as in claim 1, including:
   said truck bed cover reel including a tensioning spring for continuously keeping said cover, when extended from said reel housing, in spring tension to return said cover to said reel housing.

3. The apparatus according to claim 2, including:
   a lead slat connector at one end to said cover; and
   a tailgate lip cover shaped into an inverted L-shaped structure connected to said lead slat.

4. The apparatus according to claim 3, wherein said tailgate lip cover includes an engagable protrusion integrally formed along the longitudinal length thereof for slidable insertion into a mating receptacle formed along the length of said lead slat.

5. The apparatus according to claim 4, wherein said tailgate lip cover includes a means for sealing said lip cover to the top surface of a conventional tailgate.

6. The apparatus according to claim 1, wherein said handle is lockable in a fixed position by use of a key.

7. The apparatus according to claim 3, wherein clockwise rotation of said handle retracts said guide track latch bolts and tailgate pin latches within said lead slat.

8. The apparatus according to claim 5, including:
   actuating arms connected to said handle and said guide latch bolts, wherein counterclockwise rotation of said handle extends said actuating arms causing said guide track latch bolts to project from each end of said lead slat.

9. The apparatus according to claim 5, wherein said guide track latch bolt includes an arcuate shaped front surface and a straight back surface, said slots having an angled wall to engage said each guide track latch bolt arcuate surface to move said guide track latch bolt against spring tension therein.

10. The apparatus according to claim 9 including a single piece locking latch mounting member available for permanent attachment to said tailgate, said mounting member including said pins attached to the tailgate for engaging said pin latch bolt means of said latching mechanism.

11. A retractable rolling, slatted cover formed from a plurality of elongated rectangular slats for covering the open cargo bed of a conventional pick-up truck having a conventional tailgate, including an apparatus for securing said truck bed cover in a plurality of positions comprising:
   an elongated rectangular lead slat connected to the free end of said cover, said lead slat having a planar upper surface and spaced apart lower surface forming a cavity therebetween, a first longitudinal edge available for hingedly interconnecting with an adjoining slat and a second longitudinal edge;
   a tailgate lip cover shaped in an inverted L-shaped structure releasably attached to said lead slat second longitudinal edge;
   a centrally disposed handle coupled to and protruding from said upper surface of said lead slat;
   a leverage arm pivotally connected and operatively associated with said handle extending from the lower surface of said slat;
   first and second diametrically opposed linkage arms movably coupled to said leverage arm;
   a spring biased truck bed cover latching mechanism coupled to said leverage arm and slidably disposed within the cavity of said lead slat and movably attached to each end of said lead slat, said latching mechanism having an outward projecting bolt, each having an arcuate shaped front surface and hook shaped tailgate locking latches mounted thereto; and
   a second spring latching mechanism movably coupled to said linkage arm and slidably disposed within the cavity of said slat and movably to the free end of said lead slat, said latching mechanism having a second hook shaped tailgate locking latch mounted perpendicular thereto; and
   an actuating strap connected to the lead slat and sized in length to extend from the reel housing to the tailgate, said strap used for moving said cover; whereby said cover can be positioned and secured to a plurality of different positions for partially or fully enclosing said truck bed.

12. The apparatus according to claim 11 wherein rotation of said handle extends said leverage arm causing said outward projecting bolts to project from each end of said slat.

* * * * *